United States Patent
Love et al.

(10) Patent No.: US 6,934,275 B1
(45) Date of Patent: Aug. 23, 2005

(54) APPARATUS AND METHOD FOR PROVIDING SEPARATE FORWARD DEDICATED AND SHARED CONTROL CHANNELS IN A COMMUNICATIONS SYSTEM

(75) Inventors: Robert T. Love, Barrington, IL (US); Brian K. Classon, Palatine, IL (US); Amitava Ghosh, Vernon Hills, IL (US); Louay A. Jalloul, Palatine, IL (US); Mark C. Cudak, McHenry, IL (US)

(73) Assignee: Motorola, Inc., Schaumburg, IL (US)

( * ) Notice: Subject to any disclaimer, the term of this patent is extended or adjusted under 35 U.S.C. 154(b) by 908 days.

(21) Appl. No.: 09/703,775

(22) Filed: Nov. 1, 2000

Related U.S. Application Data

(60) Provisional application No. 60/197,588, filed on Apr. 17, 2000.

(51) Int. Cl.$^7$ ............................................. H04B 7/216
(52) U.S. Cl. ...................... 370/342; 370/335; 370/441; 370/442; 370/320; 370/321; 455/450; 455/451; 455/452.1
(58) Field of Search .............................. 370/342, 345, 370/441, 479, 496, 442, 320, 321; 455/435.1, 455/450, 451, 452.1

(56) References Cited

U.S. PATENT DOCUMENTS

| | | | | |
|---|---|---|---|---|
| 5,859,840 A | * | 1/1999 | Tiedemann, Jr. et al. | ... 370/335 |
| 6,032,047 A | * | 2/2000 | Cerwall et al. | ............. 455/450 |
| 6,167,270 A | * | 12/2000 | Rezaiifar et al. | ........... 455/442 |
| 6,226,315 B1 | * | 5/2001 | Sriram et al. | ................ 375/140 |
| 6,351,460 B1 | * | 2/2002 | Tiedemann, Jr. et al. | ... 370/332 |
| 6,438,119 B1 | * | 8/2002 | Kim et al. | ................... 370/335 |
| 6,442,152 B1 | * | 8/2002 | Park et al. | .................... 370/341 |
| 6,526,030 B2 | * | 2/2003 | Rezaiifar et al. | ........... 370/335 |
| 6,621,809 B1 | * | 9/2003 | Lee et al. | .................... 370/335 |
| 6,674,739 B1 | * | 1/2004 | Lee et al. | .................... 370/342 |

OTHER PUBLICATIONS

Anthony Noerpel, Hybrid Signaling for WACS, 1992, IEEE, 49-52.*

Ghosh et al., Shared Channels for PAcket Data Transmission in W-CDMA, IEEE, pp. 943-947, Apr. 1999.

ESA Proposal of a Candidate RTT, Wideband CDMA Option for the Satellite Component of MIT-2000 "SW-CDMA", Internet, pp. 1-26, Jun. 27, 1998.

* cited by examiner

*Primary Examiner*—Wellington Chin
*Assistant Examiner*—Chuong Ho

(57) ABSTRACT

Separate forward dedicated and shared control channels are provided in a spread-spectrum communication. The forward dedicated control channel is used to communicate persistent control information and point to the shared control channel when further intermittent control information concerning transmission of data to a mobile station needs to be communicated. The use of a dedicated control channel for only necessary persistent control information, while only pointing to a shared control channel when it is needed, affords more efficient utilization of system resources.

27 Claims, 2 Drawing Sheets

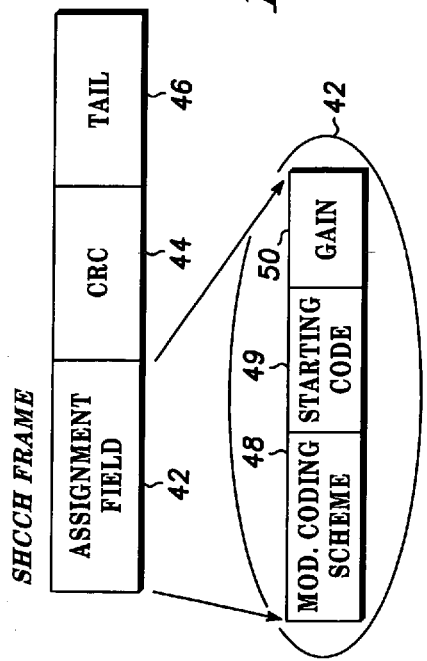
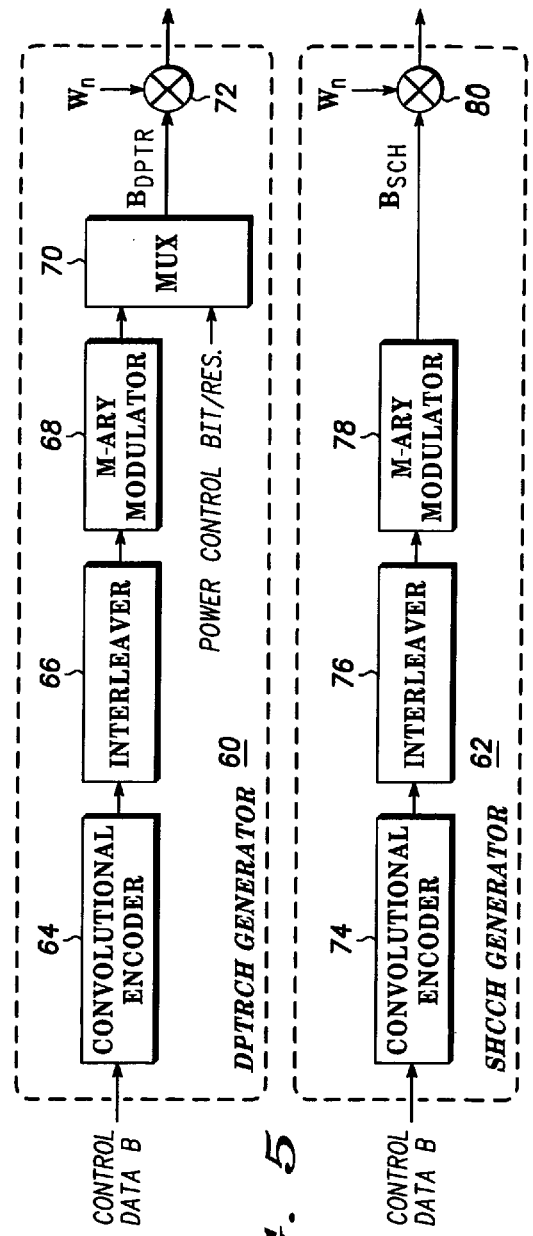

APPARATUS AND METHOD FOR PROVIDING SEPARATE FORWARD DEDICATED AND SHARED CONTROL CHANNELS IN A COMMUNICATIONS SYSTEM

RELATED APPLICATIONS

This application claims the benefit of U.S. Provisional Application No. 60/197,588, filed Apr. 17, 2000.

BACKGROUND OF THE INVENTION

The present invention relates to an apparatus and method for providing separate dedicated and shared control channels in a communications system and, more particularly, in a forward link of a Code Division Multiple Access (CDMA) communication system.

Typically in communication systems such as CDMA and, more particularly, CDMA evolutions such as WCDMA, dedicated channels are required for sending data and also for control of the system. Within the forward link of such systems, a single channel is used to carry the information to be transmitted and characteristics of the transmitted information are conveyed on another separate forward control channel. Each of these channels occupies a Walsh code from a finite set of available Walsh codes. To keep the system from becoming Walsh code limited it is important to conserve Walsh code resources. The allocation of these dedicated channels for each user typically requires rapid shuffling between dormant and active states to free up Walsh code resources. Problems that arise from this rapid shuffling include too few bits available, too few users, too much power, too much reverse link automatic repeat request (ARQ), latancy, or too much reliance on using a data channel such as a shared channel (SHCH) for layer 3 information (e.g., switching of mobile stations between active and hold states) and ARQ. The shared channel SHCH is the forward channel used to send data packets to users in the active state and can reach very high peak data rates by using over 80% of the available Walsh code resources. However, the Walsh code resources are limited in the conventional systems because of the relatively small spreading factor sizes required to support the required payload and coding bits sent on the SHCH. Thus, a larger size spreading factor is critical for affording less power and more users to be supported, which are possible if bits can be more efficiently allocated.

Stated differently, the desire is to use as little of the Walsh Code resource as possible for a dedicated channel that, therefore, requires using a large spreading factor (a Walsh code of relatively large size such as 256 for CDMA2000 or WCDMA). The smaller the Walsh code resource used, the larger the number of dedicated channels that may be supported, which helps make rapid shuffling requirements less stringent. With a large spreading factor it is difficult to support many bits for a given frame duration, which is typically small (e.g. 3.33 ms) to match that of a data channel like the SHCH, and to optimize over the air transmission and scheduling. Using smaller spreading factors not only uses more Walsh code resources, but requires more transmit power for a given reliability level and reduces system capacity. Also it is possible to achieve more bits with a large spreading factor by using higher order modulation such as 8PSK but, again, at the expense of more transmit power.

There is therefore a need for a method and apparatus that affords more efficient allocation of bits and Walsh codes resources in a spread spectrum communication system.

BRIEF DESCRIPTION OF THE DRAWINGS

FIG. 4 illustrates a frame format of a shared control channel according to an embodiment of the present invention; and FIG. 5 illustrates a schematic diagram for providing separate dedicated and shared control channels according to an embodiment of the present invention.

DETAILED DESCRIPTION OF THE PREFERRED EMBODIMENTS

In order to better use the Walsh Code resource efficiently, it is possible to separate control and layer 3 information into data that is required to be sent in every frame interval whether or not a mobile user is scheduled to receive data over a data channel such as the shared channel (SHCH) and additional data that only needs to be sent when the SHCH is scheduled for that user or when layer 3 information needs to be sent. Hence, it is more efficient to provide a set of dedicated control channels for the data that is always required to be sent and a smaller set of shared control channels for the additional data, which is sent less frequently.

According to this scheme of separating information into different channels, the dedicated control channel is always transmitted to a given user that is not in a dormant state. The shared dedicated channel is allocated to a given user if it is to receive data over a data channel such as the SHCH and needs information to properly decode and use it or layer 3 information needs to be sent and hence, in either case, more bits are needed. Typically, only a small number of users (e.g., <3) will be simultaneously scheduled for a given frame interval or will need layer 3 information, hence, a smaller number of shared control channels are required compared to the dedicated control channels. Dedicated control channels will be referred to as dedicated pointer channels (DPTRCH) in this description.

Hence, the present invention is directed to a method and apparatus that provide a separate pointer channel and shared control channel instead of a single control channel as employed in the conventional systems. Thus, a statistical approach can be taken that allows control information and other information that is requisitely persistent to be transmitted via a dedicated control channel while other information that is intermittent may be transmitted in shared channel resources. This statistical splitting of control information into multiple channels affords more economical use of Walsh code resources and sufficient bits at lower power levels without over reliance on the shared channel SHCH. The dedicated pointer control channel DPTRCH is used to continuously communicate information including whether or not a mobile unit in a forward link portion of a spread spectrum communication system has need to receive information concerning a data channel such as a shared channel SHCH that is accessed via the shared control channel SHCCH. Hence, the dedicated pointer control channel DPTRCH is used to point to the shared control channel SHCCH when information is to be sent via a data channel, in this case the shared channel SHCH, thereby allowing the shared channel resources to be used only when needed and, hence, more efficiently.

Figure 1:
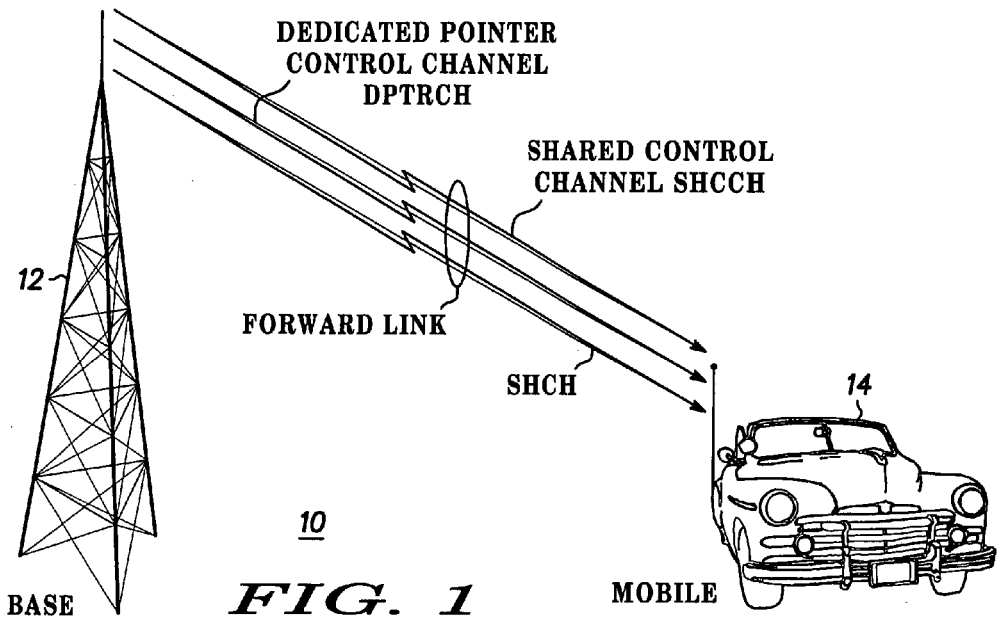
FIG. 1 illustrates a diagram of a communication system incorporating the method and apparatus incorporating a method and apparatus using separate dedicated and shared control channels in accordance with a preferred embodiment.

FIG. 1 illustrates a communication system, shown generally at 10, including a base station 12 and a mobile unit 14. Within the forward link from the base 12 to the mobile 14, is the shared channel SHCH, the shared control channel SHCCH and the dedicated pointer control channel DPTRCH as identified in FIG. 1. In the present system, however, only the dedicated power control channel DPTRCH is persistent, allowing only those mobile units in an active state that require further control via the shared control channel SHCCH and the forward link channel SHCH to have more available Walsh codes to use. The dedicated pointer control channel DPTRCH is used to point to a pool of shared control channels SHCCH that supplement the payload of the dedicated pointer control channel DPTRCH in order to convey assignments on the shared data channel SHCH.

Figure 2:
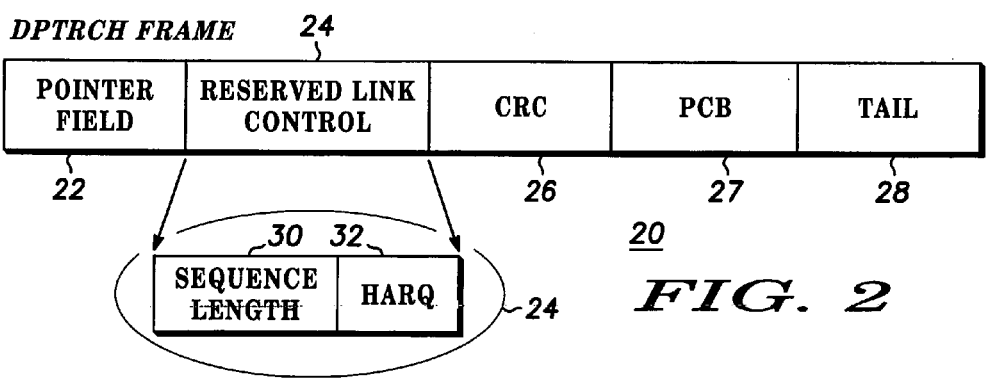
FIG. 2 illustrates a frame format for a dedicated pointer channel in an assignment format according to a preferred embodiment of the present invention.

FIG. 2 illustrates a typical dedicated pointer control channel frame 20 in an assignment format (i.e., when the frame is used to convey information concerning a shared control channel SHCCH). Within this frame 20 are a number of information fields that are used to convey information essential for maintaining users in the cell area of the base 12, whether in inactive or control hold state. The first field is an indicator or pointer field 22 that communicates whether information on a shared control channel SHCCH needs to be transmitted and the Walsh code assignment of the particular shared control channel SHCCH to which this field points. The pointer field 22 may be of any length necessary to communicate the number of different shared channel Walsh codes allocated for the shared channels. In a preferred embodiment, this pointer field is set at 3 bits, which is capable of communicating up to 8 different states of the shared channel SHCCH.

The next field within the dedicated pointer channel DPTRCH frame 20 is a reserved link control 24 that is used to communicate information such as the message sequence length shown in field 30 contained within the reserved link control field 24. The reserved link control field 24 may also contain reverse link scheduling information (not shown). Further information may include a hybrid automatic repeat request HARQ shown in field 32 of the reserve link control 24. In an alternate embodiment, the reserved link control field 24 may contain the starting Walsh code, the modulation coding scheme (MCS) and ARQ information.

The dedicated pointer channel frame DPTRCH also contains cyclic redundancy check CRC information for forward error correction shown in field 26 of the frame 20. Additionally, the frame contains power control bit information 27 to regulate the reverse link power for a CDMA system and a tail 28 to mark the end of the frame.

According to a preferred embodiment, the dedicated pointer frame DPTRCH is typically 5 milliseconds long. However, the time length of the frame is not limited to this amount, but could be modified to whatever particular communication system the frame is being used. Similarly, the fields and width in 110 bits may also be modified on the DPTRCH.

Figure 3:
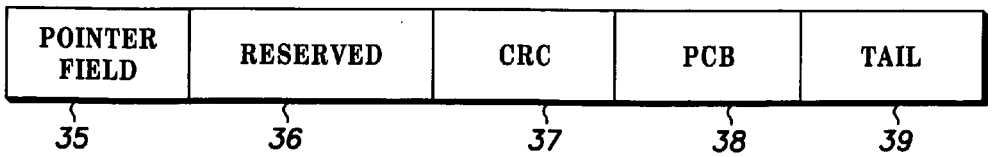
FIG. 3 illustrates a frame format for a dedicated pointer channel in a null format according to a preferred embodiment of the present invention.

FIG. 3 illustrates a dedicated pointer channel frame DPTRCH in a "null" format or, in other words, when information is not required to be transmitted on a corresponding shared control channel SHCCH. Similar to the assignment format 20, the null frame 34 contains a pointer field 35, a CRC field 37, a power control is bit field 38 and a tail 39. Different from the assignment format, the null frame format merely transmits a reserved field 36 containing reverse link scheduling information for the reverse link in a CDMA system.

FIG. 4 illustrates a shared control channel SHCCH frame shown generally at 40. This frame includes an assignment field 42 having various aperiodic or intermittent information such as information required for demodulation of the shared channel SHCH or as a transport for automatic repeat request ARQ feedback in layer 3 signaling information. The assignment field 42 of FIG. 4 is shown to include fields 48–50, which may include a field 48 for indicating the particular modulating coding scheme MCS that is used in the forward shared channel SHCH, a starting Walsh code 49 and gain information 50. Similar to the dedicated pointer control frame, the shared channel frame 40 also includes a cyclic redundancy check CRC field 44 and tail information in field 46. Correlating with the alternate embodiment discussed previously in connection with FIG. 2, the assignment field 42 may instead contain gain information, ARQ information and Layer 3 signaling information, while the dedicated pointer channel frame carries information concerning the starting Walsh codes, the MCS and further ARQ information. Other combinations of field assignments to the DPTRCH and the SHCCH are also possible. In addition, further enhancements of the scheme are readily observable, such as additional levels of SHCCH and joint coding (either correction or error detection) across the codes a user receives and uses.

Within the present system, to insure that sufficient number of Walsh codes are available for the forward shared channels, the dedicated pointer channel DPTRCH and shared channel SHCCH are assigned to part of a Walsh code tree that does not overlap with the codes for the forward shared channel SHCH. For example, for Walsh codes of length 16, the dedicated pointer channel DPTRCH and shared control channel SHCCH would be assigned to a portion of a Walsh code tree that does not overlap with codes 2–15 of length 16, for instance. In a preferred embodiment, mobile users in the active state maintain a unique dedicated pointer channel DPTRCH that is assigned a Walsh code of length 512.

FIG. 5 illustrates an apparatus for generating the respective dedicated pointer control channel DPTRCH and shared control channels SHCCH. A dedicated pointer control channel generator 60 includes a convolutional coder 64 that receives control data from a transmitter (e.g., a base station) be input thereto. The convolutional coder 64 encodes the data at a particular coding rate (e.g., R= ½ rate sets). The encoding data is then sent to an interleaver 66 that interleaves the data according to any number of known interleaving schemes. After the data is interleaved, an M-ary modulator 68 modulates the data according to any number of known modulation schemes such as QPSK or 8PSK. The modulated data is then sent to multiplexer 70, which multiplexes the modulated data with power control bit information. The power control bit is included in the dedicated pointer DPTRCH since this information is required for each user within the base station 12 cell, irrespective of whether the mobile is in the active or control hold state (an active state being when data is transmitted to be received by the mobile and the control hold state being when no data is transmitted to the mobile). The multiplexed data $B_{DPTR}$ output from the multiplexer 70 is then multiplied by a multiplier 72 with a Walsh code $w_n$ and output for transmission at particular chip rate $R_c$. Preferably, the chip rate is equal to 1.2288 million chips per second (Mcps) according to the IS95 standard or 3.84 Mcps according to WCDMA.

Additionally, a switching element (not shown) or some other equivalent means to prevent the control data B from being transmitted may be utilized as will be appreciated by one of ordinary skill in the art. The control data B is prevented from being transmitted in those instances where a mobile is in a control hold state and no data via the shared channel SHCH is to be transmitted to the mobile 14 within the time frame of the dedicated pointer channel frame. Hence, a "null" frame will be generated with only the requisite power control bit information.

A shared control generator 62 contains similar elements as the dedicated pointer channel generator 60, including a convolutional encoder 74 and interleaver 76 and an M-ary modulator 78. However, the shared channel control generator 62 does not require a multiplexer since the power control bit information is sent only via the dedicated pointer control channel DPTRCH. Thus the modulated control data $B_{SCH}$ from the modulator 78 is multiplied by multiplier 80 by Walsh codes $w_n$ for transmission on the forward link. Of course, if a mobile unit to which control data is sent is in the control hold state no control data $B_{SCH}$ will be transmitted via the shared controlled channel generator 62.

As stated previously, utilization of a dedicated pointer channel DPTRCH transmitting only essential persistent control information and pointing to intermittent control information carried on the shared control channel SHCCH only when the intermittent control information has needs to be sent affords more efficient allocation of system resources in a spread spectrum communication system. Additionally, it will be appreciated by those skilled in the art that the present method and apparatus may be utilized in other communication systems that transmit overhead information such as control information in order to efficiently allocate resources.

The present invention has been described for exemplary purposes in terms of presently preferred embodiments. It should be understood, however, that persons of ordinary skill in the art may otherwise embody its broad teachings without departing from its fair scope.

What is claimed is:

1. A method for providing control information in a communication system comprising the steps of:
   providing a first persistent forward link control channel communicating a first set of control information to at least one component within the communication system; and
   providing a second dedicated forward link control channel selectively communicating a second set of control information to the at least one component within the communication system based on the first set of control information.

2. The method according to claim 1, further comprising: transmitting data on a data channel to the at least one component; and
   wherein the first set of control information includes an indicator value that is used by the communication system to indicate that the second set of control information on the second control channel is transmitted to the at least one component, to identify the second control channel and to indicate that data on the data channel is transmitted to the at least one component.

3. The method according to claim 2, wherein the first set of control information further includes dedicated control information.

4. The method according to claim 3, wherein the dedicated control information includes at least one of power control information and reverse link scheduling information.

5. The method according to claim 2, wherein the first set of control information includes at least one of a starting Walsh code assignment of the data channel, information concerning the modulation type of the data channel, a coding rate and message sequence length.

6. The method according to claim 2, wherein the second control channel is a shared control channel selected from, a plurality of pooled shared control channels based on the indicator value.

7. The method according to claim 2, wherein the second set of control information includes at least one of information for demodulating information transmitted on the data channel, gain information, and ARQ information.

8. The method according to claim 1, wherein the communication system is a code division multiple access system.

9. The method according to claim 8, wherein the first and second control channels are part of a forward link in the code division multiple access system.

10. The method according to claim 1, wherein the first set of control information includes an indicator value that is used by the communication system to indicate that the second set of control information on the second control channel is not transmitted to the at least one component.

11. The method according to claim 1, further comprising:
    transmitting data on a data channel to the at least one component; and
    wherein the first set of control information includes an indicator value that is used by the communication system to indicate that the second set of control information on the second control channel is transmitted to the at least one component, to identify the second control channel and to indicate that data on the data channel is not transmitted to the at least one component.

12. The method according to claim 1, further comprising;
    transmitting data on a data channel to the at least one component; and
    wherein the first set of control information includes an indicator value that is used by the communication system to indicate that the second set of control information on the second control channel is not transmitted to the at least one component and data on the data channel is not transmitted to the at least one component.

13. An apparatus for providing control information in a communication system comprising:
    a first persistent forward link control channel transmitter configured for transmitting a first set of control information to at least one component within the communication system; and
    a second dedicated forward link control channel transmitter configured for selectively transmitting a second set of control information to the at least one component within the communication system based on the first set of control information.

14. The apparatus according to claim 13, wherein the first set of control information includes an indicator value that is used by the communication system to indicate that the second set of control information is transmitted to the at least one component and to identify the second control channel.

15. The apparatus according to claim 14, wherein the first set of control information further includes dedicated control information.

16. The apparatus according to claim 14, wherein the dedicated control information includes at least one of power control information and reverse link scheduling information.

17. The apparatus according to claim 14, wherein the second control channel is a shared control channel selected from a plurality of pooled shared control channels based on the indicator value.

18. The apparatus according to claim 13, further comprising:
- a data channel transmitter configured for transmitting data over a data channel to the at least one component; and
- wherein the first set of control information includes an indicator value that is used by the communication system to indicate that the second set of control information on the second control channel is transmitted to the at least one component, to identify the second control channel and to indicate that data on the data channel is transmitted to the at least one component.

19. The apparatus according to claim 18, wherein the first set of control information includes at least one of a starting Walsh code assignment of the data channel, information concerning the modulation type of the data channel, a coding rate and message sequence length.

20. The apparatus according to claim 18, wherein the second set of control information includes at least one of information for demodulating information transmitted on the data channel, gain information, and ARQ information.

21. The apparatus according to claim 13, wherein the communication system is a code division multiple access system.

22. The apparatus according to claim 21, wherein the first and second control channels are within a forward link transmitting portion of the code division multiple access system.

23. The apparatus of claim 13, wherein the first control channel transmitter is comprised of an input configured to receive control data; an encoder connected to the input for encoding control data, an interleaver for interleaving the encoded control data; a modulator for modulating the interleaved encoded control data according to a prescribed modulation scheme and outputting modulated control data; a multiplexer for multiplexing the modulated control data with at least power control information, the multiplexer outputting multiplexed control data; and a multiplier for multiplying a Walsh member with the multiplexed control data.

24. The apparatus of claim 13, wherein the second control transmitter is comprised of an input configured to receive control data; an encoder connected to the input for encoding control data, an interleaver for interleaving the encoded control data; a modulator for modulating the interleaved encoded control data according to a prescribed modulation scheme and outputting modulated control data; and a multiplier for multiplying a Walsh number with the modulated control data.

25. The apparatus according to claim 13, wherein the first set of control information includes an indicator value that is used by the communication system to indicate that the second set of control information on the second control channel is not transmitted to the at least one component.

26. The apparatus according to claim 13, further comprising:
- a data channel transmitter configured for transmitting data over a data channel to the at least one component; and
- wherein the first set of control information includes an indicator value that is used by the communication system to indicate that the second set of control information on the second control channel is transmitted to the at least one component, to identify the second control channel and to indicate that data on the data channel is not transmitted to the at least one component.

27. The apparatus according to claim 13, further comprising:
- a data channel transmitter configured for transmitting data over a data channel to the at least one component; and
- wherein the first set of control information includes an indicator value that is used by the communication system to indicate that the second set of control information on the second control channel is not transmitted to the at least one component and data on the data channel is not transmitted to the at least one component.

* * * * *